(12) United States Patent
Carroll

(10) Patent No.: US 6,424,079 B1
(45) Date of Patent: Jul. 23, 2002

(54) ENERGY HARVESTING EEL

(75) Inventor: Charles B. Carroll, Princeton Jctn., NJ (US)

(73) Assignee: Ocean Power Technologies, Inc., Pennington, NJ (US)

( * ) Notice: Subject to any disclaimer, the term of this patent is extended or adjusted under 35 U.S.C. 154(b) by 0 days.

(21) Appl. No.: 09/384,822

(22) Filed: Aug. 27, 1999

Related U.S. Application Data (60) Provisional application No. 60/098,340, filed on Aug. 28, 1998.

(51) Int. Cl.$^7$ ............................................. H01L 41/04
(52) U.S. Cl. ...................................................... 310/339
(58) Field of Search ................................ 310/339, 800

(56) References Cited

U.S. PATENT DOCUMENTS

| | | | | |
|---|---|---|---|---|
| 3,816,774 A | * | 6/1974 | Ohnuki et al. | ............... 310/332 |
| 3,970,877 A | * | 7/1976 | Russell et al. | ............... 310/339 |
| 4,056,742 A | * | 11/1977 | Tibbetts | ....................... 310/357 |
| 4,387,318 A | * | 6/1983 | Kolm et al. | ................. 310/330 |
| 4,404,490 A | * | 9/1983 | Taylor et al. | ................. 310/339 |
| 4,904,222 A | * | 2/1990 | Gastgeb et al. | .............. 446/405 |
| 5,223,763 A | * | 6/1993 | Chang | .......................... 310/339 |
| 5,494,468 A | * | 2/1996 | Demarco, Jr. | ................. 441/64 |
| 5,621,264 A | * | 4/1997 | Epstein et al. | ............... 310/339 |
| 6,011,346 A | * | 1/2000 | Buchanan et al. | ........... 310/339 |

* cited by examiner

*Primary Examiner*—Nestor Ramirez
*Assistant Examiner*—Peter Medley
(74) *Attorney, Agent, or Firm*—Michael Y. Epstein (57) ABSTRACT

A piezoelectric power generator, particularly for use in a flowing fluid stream, comprises an elongated, flexible central layer of a dielectric material having, spaced axially along opposite sides thereof, a plurality of separate piezoelectric elements each formed from a portion of a continuous layer of a piezoelectric layer extending along each opposite side of the central layer sandwiched between a pair of electrodes unique to each piezoelectric element.

7 Claims, 9 Drawing Sheets

ENERGY HARVESTING EEL

This application claims the benefit of provisional patent application No. 60/098,340 filed Aug. 28, 1998.

BACKGROUND OF THE INVENTION

This invention relates to the conversion of energy from naturally occurring sources of mechanical energy, and particularly to the conversion of mechanical energy present in flowing water to useful energy.

While not limited thereto, the invention has particular utility for the generation of relatively small amounts of power for use in small devices intended for long life in inaccessible locations. For example, to perform long endurance military missions, small unattended sensors or robots need more electrical power to sense, communicate, or move than they can practically carry in a precharged power storage device. This means that they must be able to harvest energy from their environment during the mission to periodically re-charge their power sources. The small size of the devices typically used in military systems makes it difficult to collect a useful amount of power since natural energy usually occurs as a "flux", and the amount available for collection depends on the physical capture area. Thus, there is a need for a small, highly reliable family of power generators that efficiently convert environmental energy into electrical power. This need is satisfied according to the present invention.

SUMMARY OF THE INVENTION

A power generator, particularly useful for collecting power from flowing fluids, comprises an elongated, eel-like structure for being disposed within a flowing fluid for causing energy generating eel-like or sinuous undulations or flutterings along the length of the structure. In a preferred embodiment, the structure comprises an elongated, central layer of a flexible material providing a common support for a plurality of separate energy generating elements spaced along opposite sides of the support. Each element comprises a length of a flexible and preferably plastic-like piezoelectric material (which can be part of a continuous sheet of the material) having electrodes on opposite sides thereof forming a capacitor for collecting electric power generated by the elements. For inducing turbulence in the flowing fluid (if not already present) for more efficient mechanical coupling of the fluid to the structure, the structure is disposed downstream of a vortex generating "bluff body" which, in one embodiment, is a flat plate disposed transversely in the path of the fluid flow for generating vortices at the plate edges. The vortices induce undulations in the downstream structure.

DESCRIPTION OF THE DRAWINGS the drawings are schematic and not to scale.

DESCRIPTION OF PREFERRED EMBODIMENTS

Figure 1:
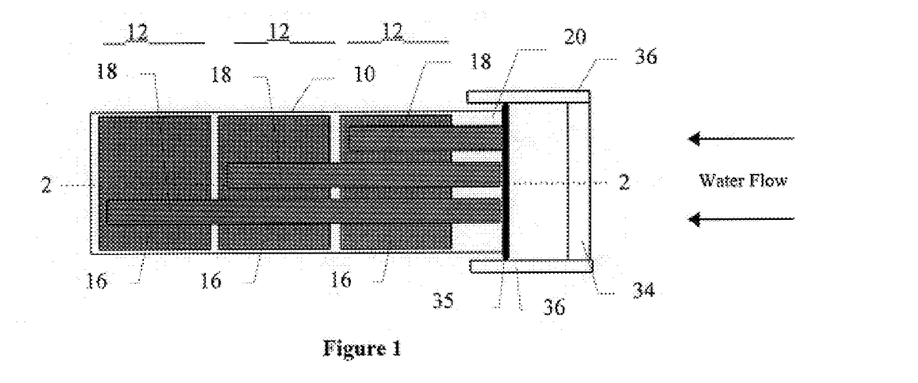
FIG. 1 is a side elevation of one embodiment of a power generator according to the invention and showing a vortice including bluff body.
Figure 2:
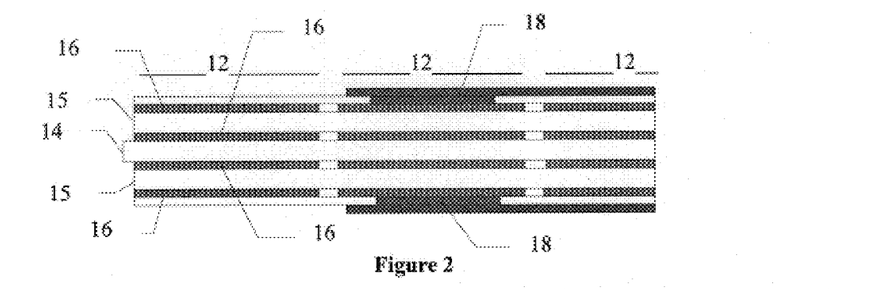
FIG. 2 is a sectional view of the generator taken along line 2—2 in FIG. 1.
Figure 3:
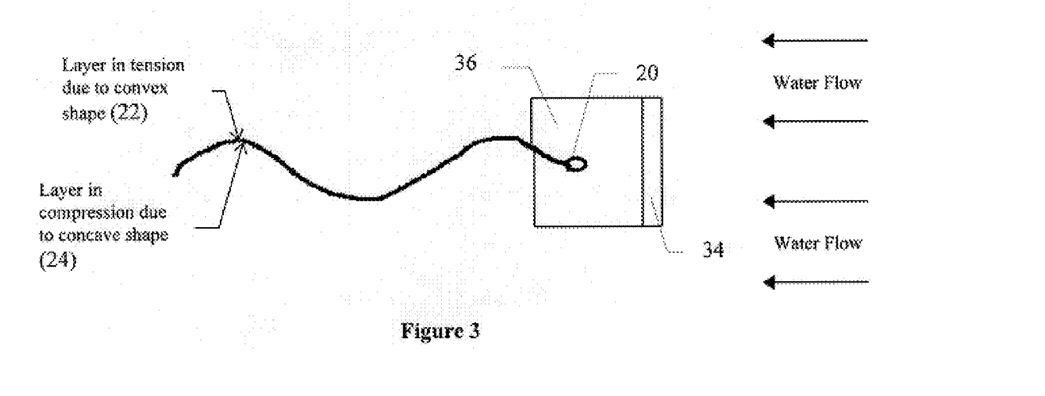
FIG. 3 is a top view of the generator shown in FIG. 1 showing one instantaneous configuration when the generator is disposed within a fluid flowing axially along the length of the generator.

One embodiment of a power generating "eel" 10 according to the present invention is shown in FIGS. 1 and 2. Basically, the "eel" comprises an elongated, flexible structure having a plurality of separate piezoelectric power generating elements 12 disposed along the structure on either side thereof. When disposed in a flowing fluid, e.g., within a flowing stream of water such as shown in FIG. 3, the structure undulates in response to the flowing fluid thereby causing repetitive flexures of the separate piezoelectric elements and the generation of generally out-of-phase electrical power in the respective elements. The power from each element is separately collected and thereafter electrically combined for generating electrical energy from the "eel".

The eel 10 shown in FIGS. 1 and 2 comprise an elongated, rectangular layer 14 of a non-piezoelectric material, e.g., non-piezoelectric PVDF or polyurethane, having, by way of example, a thickness of 110 microns, a width of 3 inches, and a length of 12 inches. The layer serves as a common, central support, "backbone", for the eel. A layer 15, or a laminate of such layers, each of a piezoelectric polymer, is disposed along the length of the central layer 14 and on opposite sides thereof. Portions of the layer or laminate are used to form a series of separate piezoelectric elements 12 disposed along each side of the structure. In FIGS. 1 and 2 three elements 12 are shown.

Piezoelectric power generating elements are priorly known, and each of the elements 12 can, in accordance with known technology, comprise a layer of a known piezoelectric material, e.g., the plastic-like material PVDF, or electrostrictive, "electric field induced piezoelectric", materials such as PVDF:TrFE and polyurethane. As known, flexure of such materials induces the generation of electrical charges which can be collected by means of electrodes, e.g., layers of gold, carbon, etc., disposed on opposite sides of the piezoelectric layer.

Herein, while each piezoelectric element 12 is electrically separate from the other piezoelectric elements, all the separate elements along each side of the central layer 14 can comprise respective, spaced apart portions of a continuous layer 15 of the piezoelectric material, e.g., the aforementioned PVDF. The use of a continuous piezoelectric material layer 15 greatly simplifies fabrication of the generator. During use of the generator, and the generation of electrical charges in response to flexure of the piezoelectric material, no axial flows of charge occur, whereby each piezoelectric element 12, defined by oppositely disposed electrodes 16 on opposite sides of the piezoelectric layer 15, is electrically separate from other elements spaced along the continuous layer 15.

For extracting electrical energy from each generator element 12, each electrode 16 of each element is contacted by a respective metal terminal electrode 18 extending from an end 20 of the structure. All of the electrodes 16, and surface portions of the central layer 14 exposed between adjacent electrodes 16, are covered with a protective, dielectric layer, e.g., of urethane or polyester. Each terminal electrode 18 is insulated from electrodes 16 over which it passes and electrically contacts, through an opening through the protective dielectric layer, a respective electrode 16.

During operation, as discussed in some detail in the following Appendix, undulations are formed along the length of the structure 10 in response to turbulent vortices in the fluid stream in which the structure is disposed. Repetitive flexures of the piezoelectric elements 12 are required for the generation of electrical power. One illustrative, instantaneous configuration of the structure 10 is shown in FIG. 3. The elongated structure has, in this illustration, a continuous sine wave shape including spaced apart "crests" and "troughs". At any point along the elongated structure, e.g., at a wave crest, the piezoelectric layer on one side of the structure is bent into a convex shape while the piezoelectric layer on the other side is bent into a concave shape. The convex shaped piezoelectric layer is being stressed in tension, and electrical charge is being generated for charging the electrodes contacting the tensile stressed piezoelectric layer 15 to a first polarity; e.g., the outside electrode 16 being increasingly charged positive relative to the electrode 16 adjoining the central layer 14. Conversely, the concave shaped piezoelectric layer 15 on the opposite side of the structure is being stressed in compression and, in this example, the outside electrode of such compressively stressed piezoelectric layer is being increasingly charged negative relative to the central layer electrode.

The two piezoelectric elements on opposite sides of the structure are thus both generating electrical energy, but in 180 degree phase separation. Preferably, the axial length of each piezoelectric element matches the bending mode of the eel-like body. The body undulates in fixed modes with a shape of n/2 sine waves, e.g., ½, 1, 1½, 2, etc. sine waves. FIG. 3 illustrates a shape of 1½ sine wave and three generator elements 12, as shown in FIG. 1, are present. Each generator spans one-half of a sine wave. The reason for this is that if on the piezoelectric layer 15, a single piezoelectric element 12 overlies a portion of the sine wave where the direction of curvature is changing, i.e., if it spans more than one-half of the wave, axially spaced apart ends of the piezoelectric element are being oppositely stressed and opposite polarity electrical charges are being generated and collected in each of its two electrodes. The opposite polarity charges cancel one another thereby reducing, possibly to zero, the energy generation of the element. In practice, an eel of a specific shape and mechanical modulus will undulate in a fixed number of bending modes over a relatively wide range of water flow velocities.

The use of ganged together separate and out-of-phase piezoelectric power generating elements, and means for properly combining the out-of-phase power into useful, e.g., d.c energy, is known.

As mentioned, energy generating undulations in the structure 10 are caused by turbulence in the fluid flowing past the structure. While the mere presence of the structure 10 in an otherwise smoothly flowing fluid stream will cause some turbulence in the fluid flow, it is desirable, for maximizing the power output of the device, to increase the amount of fluid flow turbulence. This is discussed in some detail in the following appendix. In general, however, and as illustrated in FIGS. 1 and 3, some sort of turbulence generating element is preferably disposed immediately upstream of the structure 10. Turbulence within fluid flows has been extensively studied (generally for overcoming turbulence) and, in accordance with such studies, turbulence causing agents are referred to as "bluff bodies".

In FIGS. 1 and 3, the end 20 of an eel structure 10 is shown disposed downstream from a bluff body 34. In general the greater the turbulence (larger vortices) the greater the amplitude of undulation. The higher the water flow velocity, the higher the rate of undulations. Both high amplitude and high rate of undulation increase the power output from the structure 10.

While different bluff bodies can be used, a quite simple and effective bluff body shown in FIGS. 1 and 3 comprises a flat plate 34 disposed transversely to the direction of water flow and directly in front of and spaced away from the end 20 of the eel structure 10. Assuming that FIG. 3 shows a view looking down on the eel structure 10, the plate 34 is disposed vertically in the water stream and, as the water flows around the vertically extending sides of the plate 34, water flow vortices are generated (trailing from the vertical plate edges) which cause horizontal water undulations. Such horizontal water flow undulations cause the horizontal undulations of the structure 10 shown in FIG. 3.

In FIG. 1, the end 20 of the structure terminates in a return bent loop forming a vertical, hollow tube. A vertical rod 35 is disposed through the loop and is secured to and between two horizontally extending plates 36 extending from the top and bottom edges of the bluff body plate 34.

While not shown, the fixture used for mounting the head of the structure 10 to the bluff body 34 is also used for electrically connecting the ends of the various terminal electrodes 18 to electronic circuitry, e.g., hermetically mounted within the bluff body 34. Although not illustrated, the generator 10 and the bluff body 34 can be mounted on an electric power consuming device disposed within a flowing fluid. If moored in place, even small ocean currents can be used for driving the power generator.

Appendix

A new power generating technology is disclosed that focuses on the generation of electrical power from the flow energy of water in streams, currents, or pipes. The generating systems are eel-like structures made from piezoelectric polymers. They will be scaleable in size and have the capacity to generate from milliwatts to many watts depending on system size and the water flow velocity of the local environment. The smallest units can be deployed within a 5 cm cube and are expected to produce up to 250 milliwatts in a flow of 1 m/s. System performance will be maximized by optimizing each sub-system and then making trade-offs for best overall efficiency. The system block diagram is shown below.

The theoretical mechanical power available from a cross sectional area of a water flow is given by: Power=$0.5\,\eta A\rho V^3$ where $\eta$ is the efficiency of the energy capture device, A is the cross sectional area in square meters, $\rho$ is the density of water in (kg/m$^3$), approx.=1000, V is the velocity of the flow in meters per second (m/s)

In the following table an eel flow energy capture efficiency of 50%, a generating module efficiency of 50%, and a power electronics efficiency of 80% is used. Cross sectional areas of 25 cm$^2$ (5×5) and 900 cm$^2$ (30×30) are used in the table.

| Flow Velocity (m/s) | Power @ 25 cm$^2$ (milliwatts) | Power @ 900 cm$^2$ (watts) |
| --- | --- | --- |
| 1.5 | 844 | 30 |
| 1 | 250 | 9 |
| 0.5 | 31 | 1.1 |
| 0.25 | 4 | 0.14 |

A set of initial eel design assumptions, shown below, is used to illustrate the orderly progression from hydrodynamics to power extraction in the following Sections.

Eel assumptions: An illustrative basic eel in accordance with a preferred embodiment of the invention is 5 cm (2 in.) high, and approximately 20 cm long when in operation. Typical eels have the following basic structure:

1) Center non-piezoelectric layer, with printed wiring to collect electric charge.
2) A piezoelectric layer on each side of the center layer with printed separated electrodes on each side to form capacitor-like regions.
3) Thin non-piezoelectric layers on the outside of the eel to form a seal from water with printed wiring to collect electric charge.
4) The layers are laminated together to form a flexible eel shape
5) PVDF eels have a center layer of 100–110 microns thick, 2 piezoelectric layers of 100–110 microns thick, and outside layers of 28 microns thick.
6) Polyurethane eels have a center layer of 850 microns thick, 2 piezoelectric layers of 200 microns thick, and outside layers of approximately 28 microns thick.

Polyurethane has a much lower Young's Modulus than PVDF.

In use of the system, the energy of moving water is converted to electrical power by generating a regular pattern of bending and unbending of a piezoelectric or piezostrictive material. The bending mechanism preferred is similar to the undulatory motion of an eel or lamprey. These animals swim by generating an undulatory traveling wave which moves from their head to their tail along their body. A system is used which closely mimics the eel's traveling wave concept except that the forces necessary to accomplish this motion are derived from the water flowing past the body rather than from internal muscle contractions. The forces generated by traveling vortices on either side of an eel-like device are utilized to generate a traveling wave pattern along an eel-like body from which we can extract electrical energy. The body has embedded within it either piezoelectric (PVDF) or electrostrictive polyurethane materials.

Natural Flapping Modes of a Thin Membrane

The natural flapping modes of a thin membrane of small aspect ratio in a flowing stream are first considered.

Stability of a Thin Membrane to Small Disturbances

Consider the steady flow of an inviscid, incompressible fluid of density $\rho$ flowing past an initially flat, thin membrane. At some point, the membrane undergoes a small displacement $\Delta x$. The displacement will be resisted by a force F, $$F = 4\left(\frac{Ywh^3}{L^3}\right)\Delta x \qquad (1)$$

where L=half wavelength of disturbance, w=width of membrane, h=thickness of membrane, and Y=Young's modulus.

The displacement will also produce a hydrodynamic pressure difference across the membrane: the displacement of the streamlines will cause the flow velocity to decrease on the concave side and increase on the convex side. By Bernoulli's equation, there will be a pressure increase on the concave side and a decrease of the convex side. The pressure difference will therefore tend to increase the displacement, and the membrane is unstable to small disturbances. That is, when a small disturbance displacement appears on the membrane, it will tend to grow: the oscillation of the membrane is expected to be self-starting. A similar result is obtained more rigorously by Lamb (*Hydrodynamics*, CUP 6th ed., 1932).

Static Analysis of Stress Balance for Small Displacements

If the rate of deflection of the membrane is slow compared to any flow or material natural frequency, then a static analysis will indicate the final deflection in terms of the average pressure difference $\Delta p_a$. At the static equilibrium point, the average pressure difference will equal the material stress in the membrane. That is, $$\Delta p_a = \frac{F_{final}}{Lw} = 4\left(\frac{Yh^3}{L^4}\right)\Delta x_{final} \qquad (2)$$

Results from Thin Airfoil Theory

To study how the velocity and pressure perturbations are related to the shape of the membrane, use is made of thin airfoil theory.

For inviscid flow over a thin curved plate of infinite span, the lift coefficient $C_L$ is given by:

$$C'_L = \frac{2F'_L}{\rho V^2 c} = 2\pi(\alpha - \alpha_0) \qquad (3)$$

where $F'_L$ is the lift force per unit span, c is the chord length (distance from leading edge to trailing edge), $\alpha$ is the angle of attack, and $\alpha_0$ is the angle of zero lift ($\alpha_0$ expresses the contribution of the curvature to the total lift) (Duncan, Thom & Young, *Mechanics of Fluids,* Arnold 2nd ed., 1970). Here, V is the velocity of the freestream flow as seen moving with the wave in the membrane. For a parabolically-curved plate, with a maximum displacement of $\Delta x$, it can be shown that $$\alpha_0 = -\frac{2\Delta x}{c}.$$

An almost identical result is found for a semi-circular plate, as long as $\Delta x \ll c$. Also, if we put the angle of attack equal to the slope of the plate at its leading edge, we have $$\alpha = \frac{4\Delta x}{c},$$

so that $$C'_L = \frac{12\pi\Delta x}{c}. \quad (4)$$

The fact that the span is finite reduces the total lift generated: for an aspect ratio of one, the reduction is approximately a factor of three, so that for a displacement $\Delta x$ with a half-wavelength of c and a width equal to c, we have:

$$\frac{2F_L}{\rho V^2 cw} = \frac{4\pi\Delta x}{c} \quad (5)$$

As an example, we use $\rho=1000$ Kg/m$^3$, c=L, $\Delta x/c=0.26$, and V=0.2 $V_\infty$, and $V_\infty=0.2V_{flex}/0.8=0.44$ m/s. Here L=0.05 m is the length of the piezoelectric element (=½ wavelength), $\Delta x=0.013$ m, and w=0.05 m, we find $F_L=0.031$ N. The equivalent pressure is given by:

$$\Delta p_a = \frac{F_L}{cw} = 12.6 \text{ Pa}$$

From equation 2, with h=156$\mu$ and y=4×10$^9$ Pa, the corresponding $\Delta x=1.28$ mm, a factor of 10 less than that assumed above. If the thickness of the film was reduced to 56% of its original value, the two answers would agree.

Preliminary Experiments: Natural Modes

Experiments were performed in a water channel, 457 mm wide, with a water depth of 146 mm, running at 0.33 m/s. All experiments were performed using membranes 200 mm long by 50 mm wide, mounted on 4.8 mm rods at the leading edge. Four different membranes were used. In these preliminary experiments, the material properties were not characterized, but the membranes were made up of:

Membrane 1: Very thin cloth, with a low mass per unit area
Membrane 2: Very thin paper (tracing paper, or rice paper)
Membrane 3: Writing paper (copying quality)
Membrane 4: Plastic film (viewgraph material)

The membranes were positioned at the center of the channel, at mid-depth, with the supporting rod vertical. The membrane motion was observed from above, so that the image of the membrane was viewed edge-on.

Perturbations were observed on the membrane, of the order of 10 to 12 mm peak-to-peak for Membranes 1 and 2, 3 to 4 mm peak-to-peak for Membrane 3, and 2 mm peak-to-peak for Membrane 4. They did not appear to grow with streamwise distance. Evidently, in all cases the stiffness provided a sufficient restoring force to damp out the disturbances from growing larger. Increasing the flow velocity will increase the pressure force as the square of the velocity. Since the deflection of the membrane increases approximately linearly with pressure (proportional to velocity squared), and the frequency of flapping increases approximately linearly with the velocity, it is expected that the power produced by the naturally-induced flapping of the membrane will increase in amplitude significantly with flow velocity.

External Stimulation

Following these experiments, a means of enhancing the flapping amplitudes and frequencies was developed. One method is to place a bluff body upstream of the membrane.

Generation of Traveling Vortices in a Steady Flow

Figure 4:
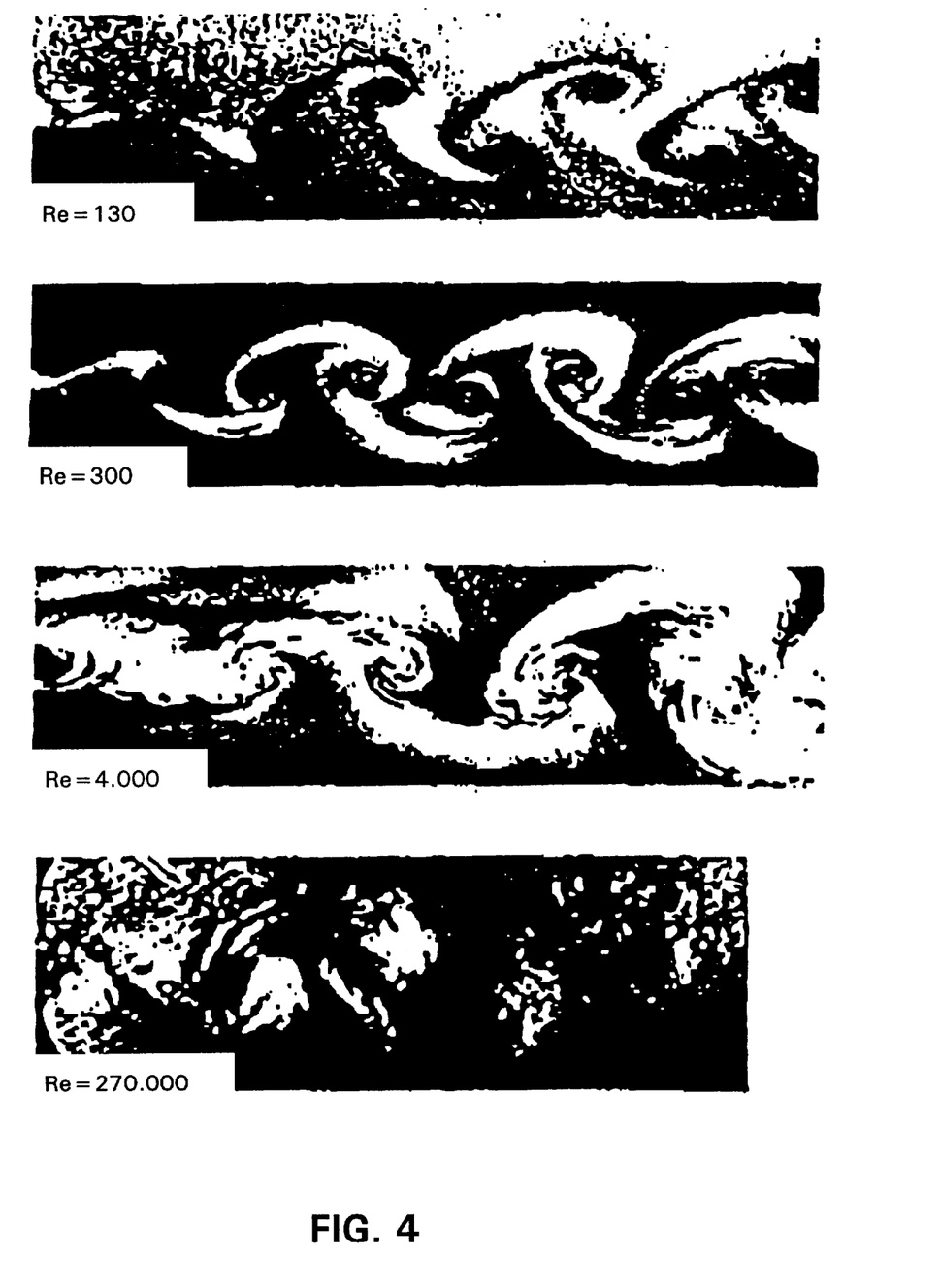
FIG. 4 is a visualization of vortices formed in a fluid downstream of a circular cylinder in the path of the fluid flow.

Any structure with a sufficiently bluff trailing edge sheds vortices in a subsonic flow. Von Larman in 1912 showed the formation of a series of staggered vortices (called a street) is generated in the wake of a circular cylinder. Visualizations of this effect are diagrammed in FIG. 4. Many other object shapes also generate vortices in their wake such as flat plates [4], planes inclined at various angles to the water flow [5], and we have all seen flags waving in the wind which indicates a staggered vortex development on either side of the flag material.

There is usually a region behind a bluff body in which this staggered vortex pattern is formed. The type of vortex formation and its stability varies with Reynolds number. For example, the distance behind the bluff body at which the vortices shed into the wake can vary significantly, and the extent of the recirculating region varies with Reynolds number and initially gets larger and then shorter. This is discussed in great detail by Williamson [7]. The importance of this concept is that if a bluff body is used upstream of the eel-like device, it must be placed at a location beyond the point at which vortex shedding begins but not too far downstream as the vortex strength reduces with distance. The eel-like device also cannot be positioned too close to the bluff body since this can prevent vortex shedding.

Figure 5:
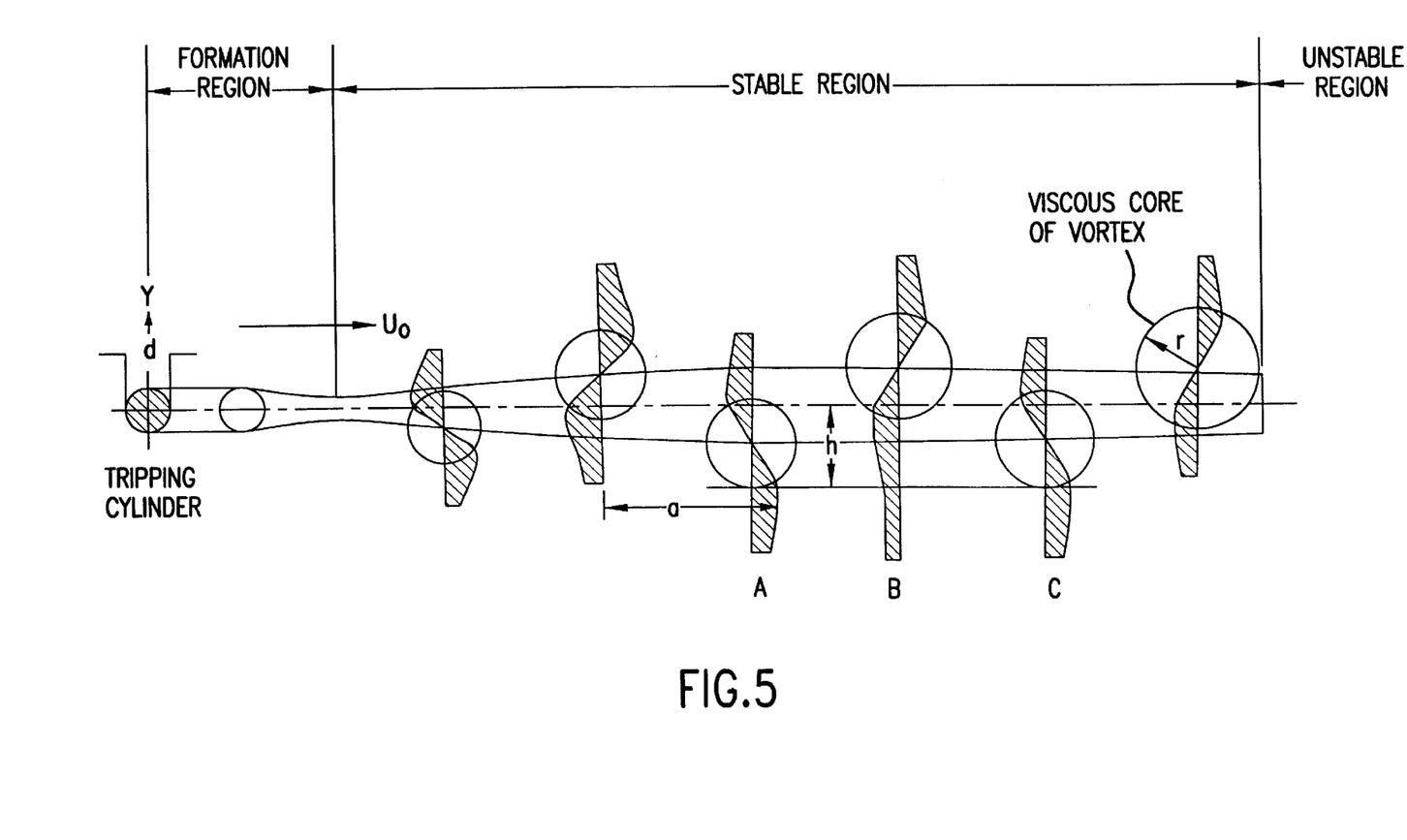
FIG. 5 is a schematic visualization of vortices of the type shown in FIG. 4.

In order to visualize a vortex street pattern in more detail, refer to FIG. 5. The tripping cylinder has a diameter (d) and the stream velocity is $U_0$. The formation region behind the body is also shown. The vortex spacing h/a is approximately 0.28 and has been verified experimentally by a number of researchers. It has also been verified that the longitudinal spacing (a) of vortices depends on Reynolds number according to:

$$a=d[Re/(0.47Re-10)] \quad (11)$$

The aspect ratio of a bluff body (length/width) has an effect on vortex generation. The vortex is weaker with reduced aspect ratio, but doesn't disappear at low values. Bearman [10] suggests that an aspect ratio of at least 5 or 6 is desirable.

Preliminary Experiments: Forced Excitation Using Vortex Shedding

It was observed by Roshko (On the Development of Turbulent Wakes from Vortex Streets, NACA Report 1191, 1954), that a rigid membrane placed in the near wake of a cylinder strongly suppressed the vortex shedding and inhibited the formation of the vortex street. No information appears to be available on the influence of a flexible membrane. If the membrane is sufficiently flexible, it will deform in response to the moving pressure field associated with the vortex passage and set up a traveling wave in the membrane with should grow with streamwise distance. The traveling wave (the "flapping" of the membrane) should be maximum when the pressure wave and the flexural wave are well matched.

To study this phenomena, and to possibly enhance the amplitude of the membrane flapping, bluff plates of constant width W were placed symmetrically 3 to 4W upstream of the leading edge of each membrane. The precise location was not important. The bluff plates shed large vortices alternately from each edge, and the shedding occurs at a frequency f determined by the Strouhal number:

$$St = \frac{fW}{V_\infty}. \quad (12)$$

For the Reynolds number range experienced in these experiments, the Strouhal number takes a constant value of about 0.15–0.21 (see FIG. E).

Four membranes were used, as previously described. Three plates were used:

Plate 1: W=12.7 mm, f=5.5 Hz
Plate 2: W=20.6 mm, f=3.4 Hz
Plate 3: W=25.4 mm, f=2.8 Hz In all cases, the addition of the bluff plates greatly increased the amplitude of the flapping, its amplitude grew with streamwise distance and increased directly with the size of the plate. The flapping frequency decreased with increasing plate size, and the flapping frequency was approximately equal to the bluff plate shedding frequency determined by the Strouhal number.

For Membranes 1 and 2, Plate 1 increased the peak-to-peak flapping to about 25 mm, Plate 2 increased it to 50 to 75 mm, and Plate 3 increased it to 100 to 125 mm. Both membranes displayed an intermittent behavior with Plate 1, suggesting that the shedding from the plate was not well coupled to the flexural wavelength of either membrane. In addition, Membrane 2 crumpled when used with Plates 2 and 3, indicating that it was insufficiently stiff to sustain two-dimensional flapping.

Membrane 3 displayed regular shedding with all three plates: 25 to 35 mm peak-to-peak for Plate 1, about 100 mm peak-to-peak for Plate 2, and 100 to 125 mm peak-to-peak for Plate 3. The frequency decreased with increasing plate size, and the best coupling between the hydrodynamic wave and the flexural wave seemed to be found using Plate 2. For this case, the shedding frequency was estimated at 3.4 Hz (at a flow velocity of 0.33 m/s), and this compares well with the frequency associated with the flexural wave assumed (where the flow velocity was assumed to be 0.35/0.8=0.44 m/s). The good coupling observed in the experiment suggests that Membrane 3 may have similar flexural characteristics to the membrane used in that example.

Membrane 4 was the stiffest membrane. For all three plates used here, the flapping was either intermittent, or of changing amplitude, suggesting poor fluid-membrane coupling. The observed peak-to-peak amplitudes were nevertheless significant: 8 to 10 mm for Plate 1, about 25 to 30 mm for Plate 2, and about 75 mm for Plate 3.

Conclusions from Experiments

The experiments showed that the enhancement of the membrane flapping amplitude by the use of an upstream bluff body is dramatic. The bluff body generates large periodic vortices which impose a moving pressure field on the membrane. In the experiments, the flapping behavior of the membranes was dominated by the hydrodynamic pressure fluctuations, in frequency and amplitude. The shedding frequencies and amplitude of the vortices generated by the bluff plates can be easily predicted, and it is thus possible to match these characteristics to the flexural amplitude and frequencies by an appropriate choice of substrate materials for the piezo-electric films.

Relationships Between Robotic Eel Developments and Energy Harvesting Eel System

Undulatory Motion for a Multi-segmented System

Figure 6:
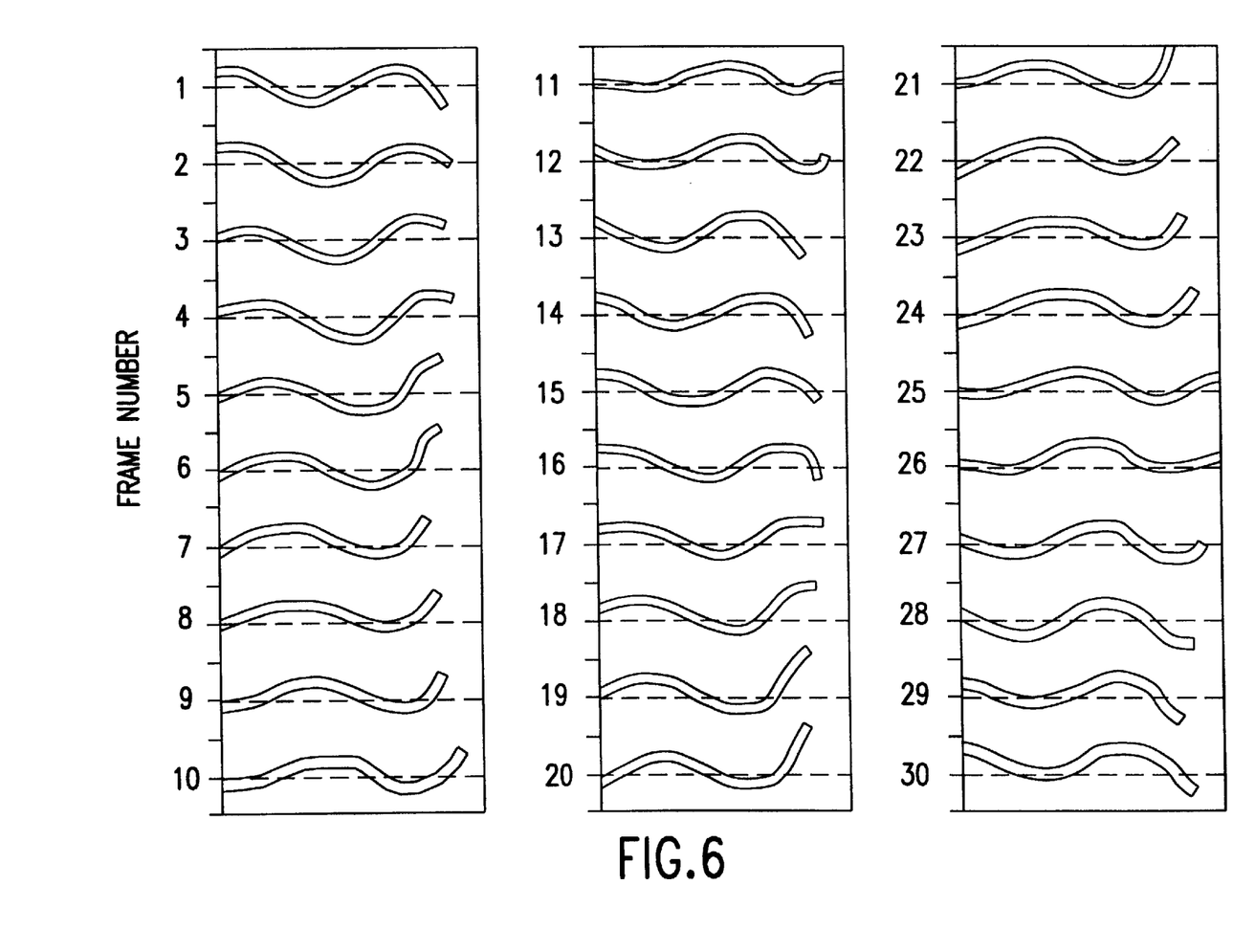
FIG. 6 shows, diagrammatically, anguilliform undulations as a function of time.
Figure 7:
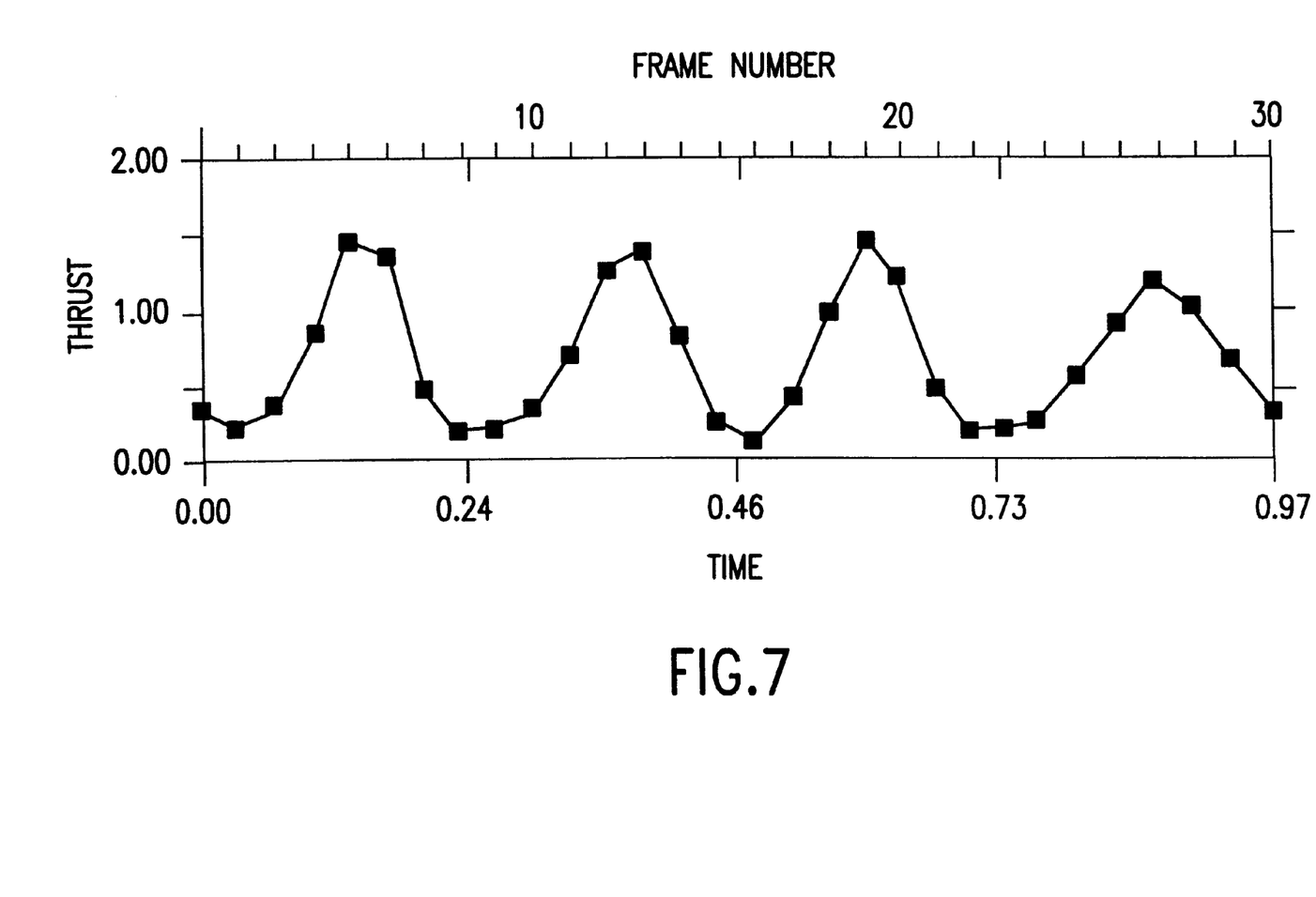
FIG. 7 is a graph plotting thrust generated during anguilliform (eel) swimming versus time.

The type of motion which is developed with a vortex generator is similar to anguilliform locomotion. Anguilliform undulations are shown diagrammatically as a function of time in FIG. 6. Such motion results from the propagation of flexion waves moving from the head region of the body to the tail at a constant velocity (steady swimming). The propagation time of the flexion wave exceeds the period of undulation for this type of motion hence there is usually more than one wave present on the body. While the traveling wave motion is smooth and continuous along the body, the resultant thrust has been shown to occur in a more pulsative fashion as shown in FIG. 7. The frame numbers shown along the top of this figure correspond to those in FIG. 6. The resultant thrust propels the fish at a certain speed and this can be directly related to frequency of undulation. Kashin [12] has made measurements of this relationship for several types of fish. For an eel body the frequency of undulation is about twice the fish speed in body lengths per second. In order to increase frequency of undulation, however, an eel must coincidentally increase its body stiffness. This is accomplished by its internal muscle activation.

Figure 8:
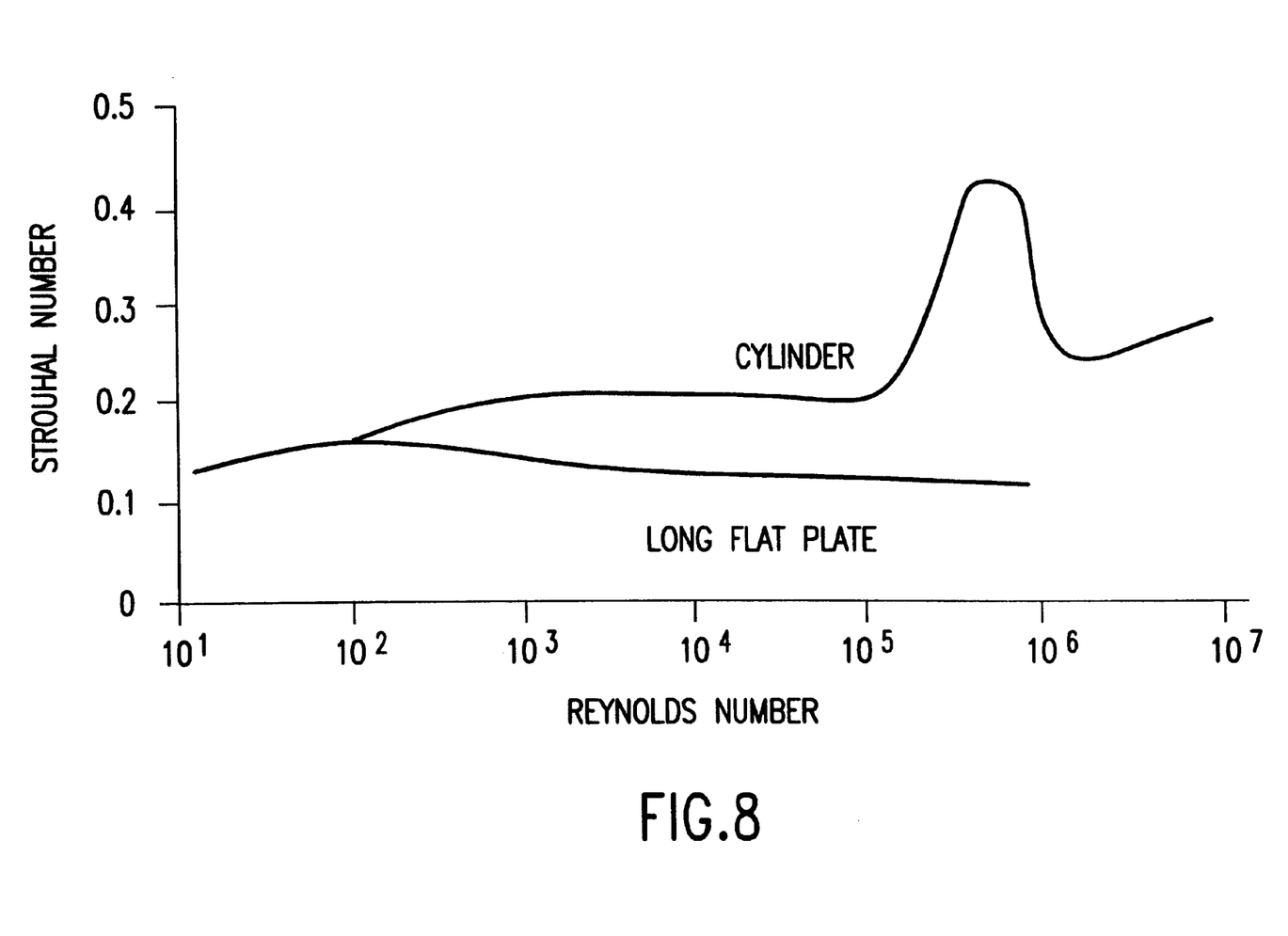
FIG. 8 shows graphs plotting Strouhal number versus Reynolds number for fluid flows normal to a cylinder and along a long flat plate.

The relationship between body stiffness and undulation frequency is an important consideration in the development of the energy harvesting system. As shown in FIG. 8, the undulation frequency varies with stream velocity, hence the stiffness of the body design and its implications for minimum and maximum stream velocity are considered. FIG. 8 shows the value of Strouhal number for both a cylinder and a flat plate as a function of Reynolds number. For example, the Strouhal number for a cylinder is about 0.2 for a large range of Reynolds number (that is, three orders of magnitude).

Figure 9:
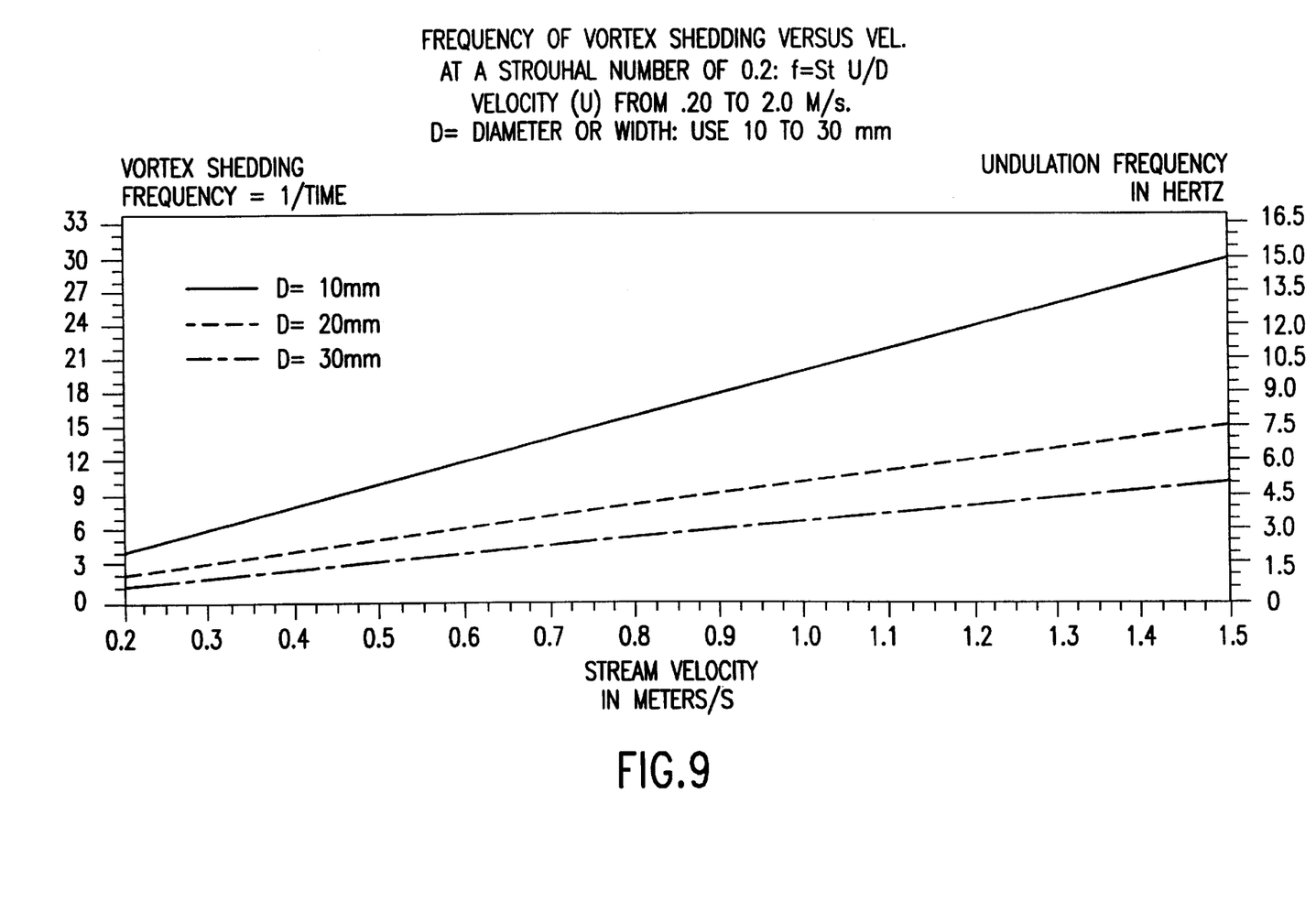
FIG. 9 shows graphs plotting frequency of vortex shedding versus stream velocity for different bluff body diameters.

We relate this Strouhal number to vortex shedding frequency through equation 12. The vortex shedding frequency to stream velocity is plotted in FIG. 9 for a value of Strouhal number of 0.2. Also plotted on the right side of the graph is the undulation frequency, which is twice the vortex shedding frequency. Notice that as the body diameter is increased, the vortex shedding frequency decreases linearly.

Eel-like Energy Harvester System Design Considerations

Vortex generators: There are several mechanisms for generating the traveling vortex trail. A fixed bluff body (cylinder, flat plate, inclined plane, etc.) can be positioned upstream of the eel-like device to generate a traveling vortex street which in turn will generate undulatory waves along the eel body. A second mechanism is essentially a flow induced oscillator. The mechanism utilizes the fact that a lifting force is generated on the bluff body by the difference in water flow around the body. If one or both ends of the body are attached such that a restoring force (spring for example) can be generated to counteract some of the lift force then the body can be made to oscillate in the steady flow. Steinman [4] described such a device called the "Steinman pendulum". Blevins [6] suggests that utilizing cylinder vibration (oscillation) at or near the vortex shedding frequency and normal to the free stream can: (1) increase the vortex strength, (2) increase the spanwise correlation of the wake, and (3) force the frequency of vortex shedding from the stationary cylinder frequency to the cylinder vibration frequency. The third type of mechanism is the flag waving analogy. Thus far little has appeared in the literature in which this mechanism has been studied in water. Our experiments have found that undulatory joint can be created in this manner, however, at the relatively low flow velocity used (0.33 m/s) the amplitude of undulation was much less than when a fixed bluff body is used to generate the vortices.

Figure 10:
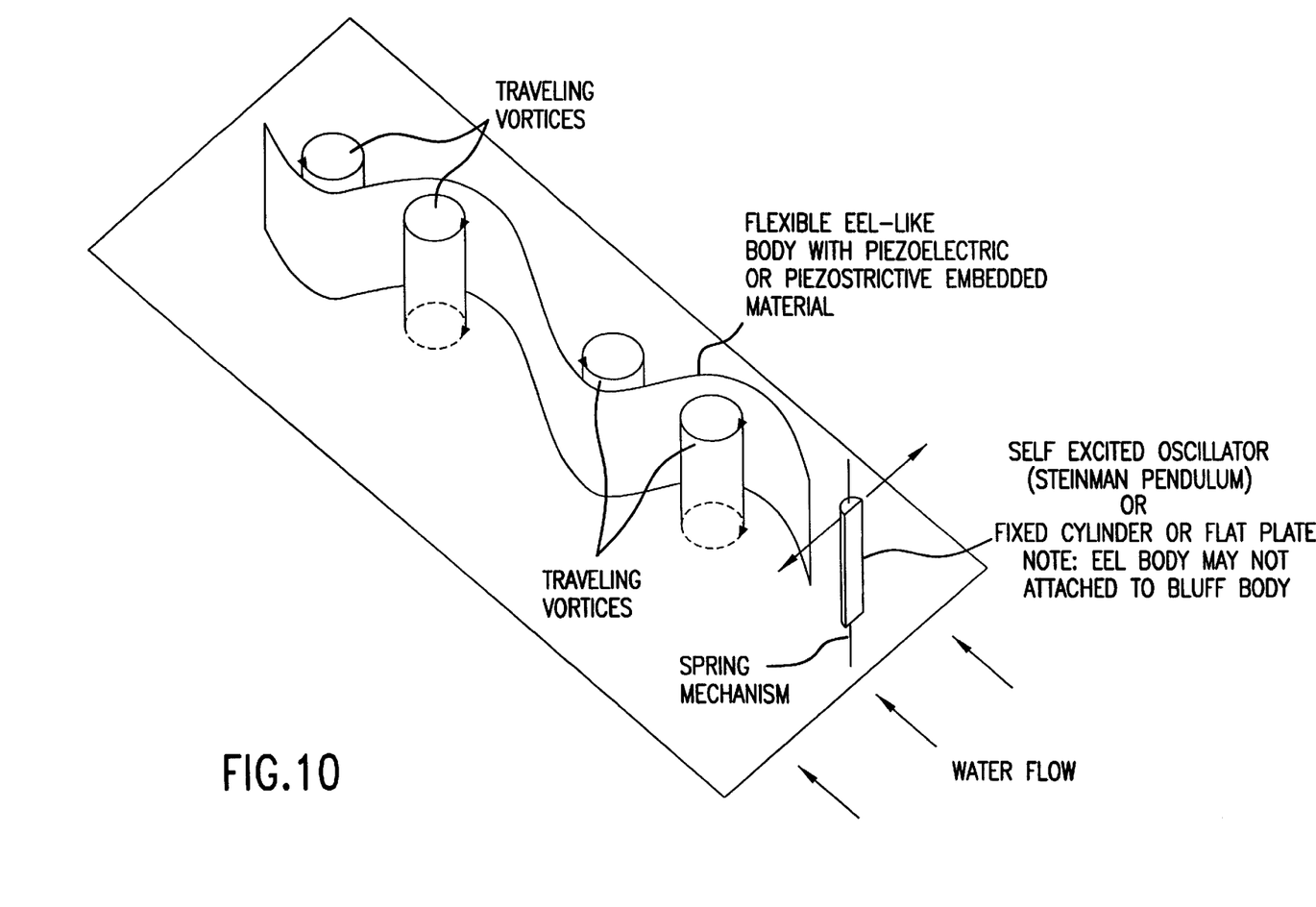
FIG. 10 is a diagrammatic view, in perspective, of an energy capturing system according to the present invention.

FIG. 10 shows a conceptual diagram of the important elements of the energy harvesting system. This figure shows a bluff body of some type upstream of the eel-like body. The vortex generated propagates alternately down each side of the eel body. The vortex pressure causes bending of the body in which piezoelectric or piezostrictive elements are imbedded. Electrical energy is created by the bending of this material and this electrical energy is removed form the system in a coordinated manner which is phased to coincide with the undulatory motion.

REFERENCES

[1] Jalbert, James. C., Kashin, Sergei, Development of a Biologically Based Undulatory Submersible Robot. January 1997 ONR report for grant #N00014-96-0919
[2] Jalbert, James C., et al. "Design Concepts for an Undulatory AUV" April 1997, 3$^{rd}$ Int. Symp. on Performance Enhancement for Marine Applications, pp. 117–128
[3] Jalbert, J. and Kashin, S. 1995. Biologically Based Undulatory Lamprey AUV Project, Phase I Report. MSEL Rpt. #95-01, submitted under grant #N00014-94-1-1035.
[4] Vogel, Steven, "Life in Moving Fluids", Princeton Univ. Press, 2nd edition, 1994.
[5] Sarpkaya, Turgut, J. Fluid Mech., 1975, vol 68, part 1, pp 109–128
[6] Blevins, Robert D., "Flow Induced Vibration", Van Nostrand Reinhold Co., 1977.
[7] Williamson, C. H. K., Annu. Rev. Fluid Mech. 1996:477–539
[8] Roshko, A., "Perspectives on Bluff Body Aerodynamics", J. Wind Ind. Aerodynamics, 49:79
[9] Eskinazi, S., "Vextor Mechanics of Fluid and Magnetofluids", Academic Press, 1967.
[10] Bearman, P. W., Annu. Rev. Fluid Mech. 1984, 16:195–222
[11] Ayers, J., et al, 1994. Biologically Based Underwater Robots. Unmanned Systems 12: 30–36.
[12] Kashin, S., et al, Brain Res, vol 82, 47–63
[13] Doligalski, T. L., Annu. Rev. Fluid Mech., 1994, 26:573–616
[14] Oertel, H. JR., Annu. Rev. Fluid Mech., 1990, 22:539–64

A Model For Piezoelectric Eel Power Generation

An analytical model has been developed for a strained (bent) section of the laminated eel. The amount of electric power that will be generated into a matched resistive load can be shown for different levels of strain and strain frequency. A comparison between eels moving in water flow made from PVDF and made from polyurethane shows that PVDF can be useful, but polyurethane is far better for power generation. The available force from the flowing water is assumed to be the same for both cases. Polyurethane is very soft so that it is easily flexed even for thicker layers which leads to higher strain. It has a ten times higher mechanical-to-electrical coupling ($d_{31}$), and one half of the dielectric constant. Following is described a method to calculate the eel resonant frequency in water flow, which calculation leads to the flexural wave propagation velocity in water.

Strain by Bending of Multi Layer Strip

Figure 11:
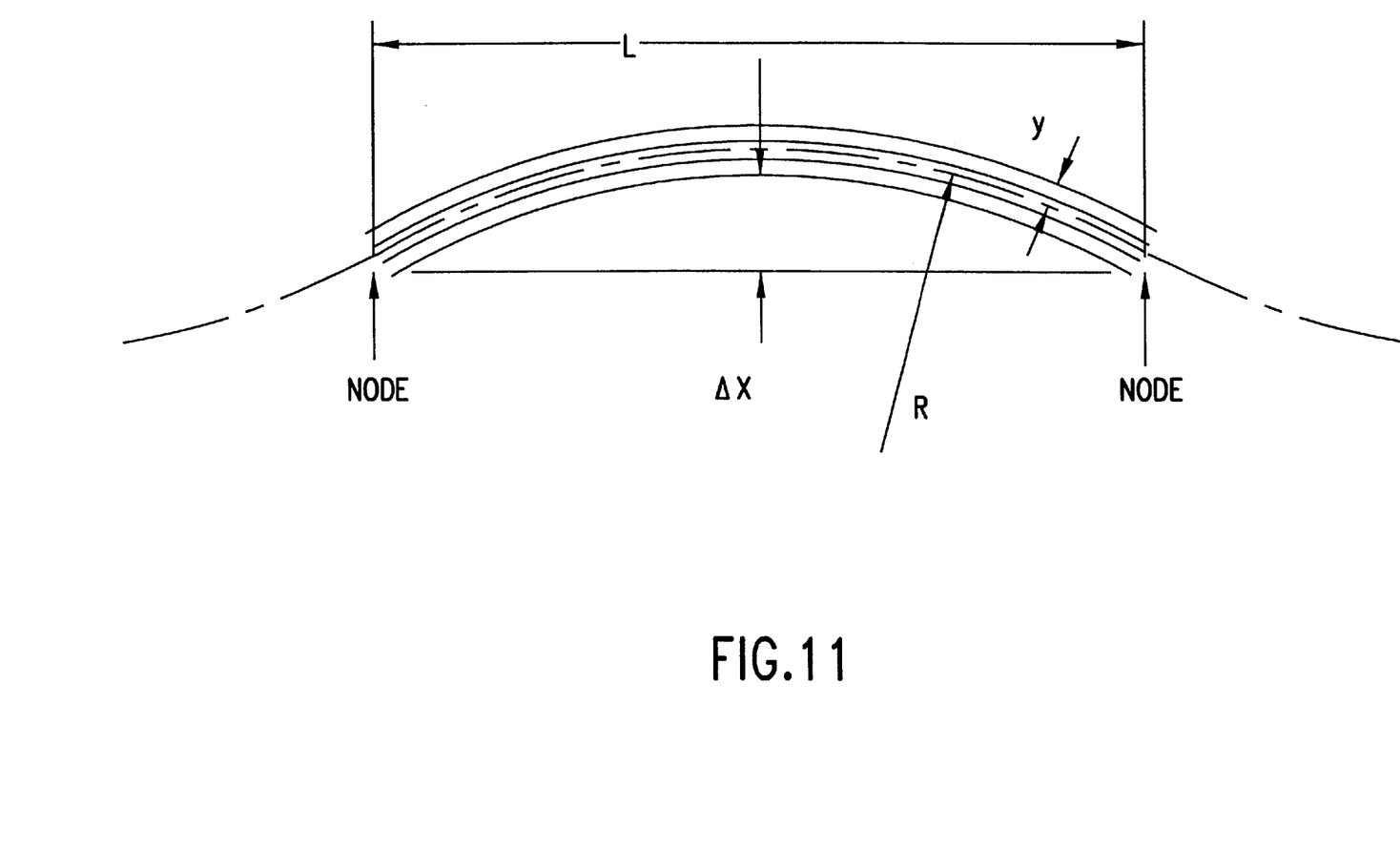
FIG. 11 identifies parameters relative to an analysis of the bending of a laminated piezoelectric element.

When a plate is bent uniformly, the relationships between displacement $\Delta x$, bend radius R, and strain S (averaged over the thickness direction of the active piezoelectric layers ) are shown in FIG. 11; where: $\Delta x = R - (R^2 - L^2/4)^{0.5}$, and $S_p = y/R$, L is the length of bent eel section, and y is distance from the neutral axis (center of the total layer) to the center of the active layer at one side. The generated power (watts) into a matched resistive load for sinusoidal motion is $$P = 0.5\pi (Y d_{31} S_p)^2 f V / \epsilon\epsilon_0$$

where Y=Young's modulus, $S_p$=peak strain, f=bending frequency, V=volume of piezoelectric layer. Note that this value is four times the value in a length expansion mode because positive and negative strains are used in the bending mode.

EXAMPLE I

Piezoelectric PVDF Eel

Y=2.7×10$^9$ N/m$^3$, $d_{31}$=22×10$^{-12}$ C/N, $\epsilon\epsilon_0$=11×8.85×10$^{-12}$ F/m (current capability available from AMP), 3 layers of 110$\mu$ PVDF, outer two layers generate power, y=110$\mu$, L–0.05 m (straight length of one electrode segment).

$f_0$=8.9 Hz (resonance calculation and necessary force are seen in the next section).

| | |
|---|---|
| ΔX = 5.5 mm | 13 mm |
| R = 6 cm | 3 cm |
| V = 2.3 × 10$^{-6}$ m$^3$ | 2.6 × 10$^{-6}$ m$^3$ |
| $S_p$ = 1.8 × 10$^{-3}$ | 3.7 × 10$^{-3}$ |
| P = 4.2 mW | 19 mW |
| F = 0.85 N | 2.1 N |

EXAMPLE II

Electrostrictive Polyurethane Eel

Y=0.05×10$^9$ N/m$^3$, $d_{31}$=280×10$^{-12}$ C/N, $\epsilon\epsilon_0$=6.5×8.85×10$^{-12}$ F/m (technical goal). Center layer is 850$\mu$ of polyurethane, and 2 layers of 200$\mu$ piezoelectric polyurethane, outer two layers generate power, y=525$\mu$, L=0.05 m. $f_0$=8.9 Hz. (resonance calculation and necessary force will be in the next section.) Note: The 200 microns of piezoelectric material can be made up of four 50 micron layers, with the required electrodes on each layer.

| | |
|---|---|
| ΔX = 5.5 mm | 13 mm |
| R = 6 cm | 3 cm |
| V = 4.1 × 10$^{-6}$ m$^3$ | 4.7 × 10$^{-6}$ m$^3$ |
| $S_p$ = .88 × 10$^{-2}$ | 1.8 × 10$^{-2}$ |
| P = 15 mW | 69 mW |
| F = 0.85 N | 2.1 N |

The output power was improved by ~350% in EXAMPLE II compared with I. The necessary force to deflect is exactly the same for two cases because the spring constant for the two cases were chosen to be identical and the displacement x is the same. Also the resonant frequency will be the same as seen in the next section.

Spring Constant, Force and Resonance

When a long strip is vibrating in a standing wave mode, the nodes can be fixed without changing the resonance frequency. Therefore, the structure shown above can be used for resonant frequency calculation, assuming the nodes are fixed. To calculate the spring constant K, the force, F, normal to the surface at the center is assumed and the relation with the displacement Δx is:

$$F=K\Delta x=(4Ywh^3/L^3)\Delta x,$$

then the spring constant, $$K=4(Ywh^3/L^3) \tag{1}$$

As for the parameters of examples I and II, the Y of PVDF is 54 times of polyurethane, and the h of polyurethane was chosen to be 3.8 times thicker. Therefore the force to deflect the same amount is identical for two cases.

The resonant frequency in water is usually much lower than that in air. The reason is that some amount of water vibrates with the eel, and that large water mass can be considered as attached to the eel generator. After the analysis shown in next section, it is concluded that water a certain distance from the surface of a vibrator plate is moving, and the thickness of the moving region is constant over wide range of frequency and amplitude. The thickness is determined only by the area of vibrator. The resonant frequency of a model mass held by a spring is:

$$f_0=(1/2\pi)(K/M)^{0.5} \tag{2}$$

where mass M is that of water in the moving region and the mass of the film is negligibly small. Using the expression for M which is derived in equation (8) in the next section, $$f_0=0.504L^{-2.25}w^{-0.25}(Yh^3/\rho)^{0.5} \tag{3}$$

$f_0$=8.9 Hz for L=W=0.05 m, h=330$\mu$, $\rho=10^3$ Kg/m$^3$, Y=2.7× $10^9$ N/m$^2$ for example I, and $f_0$=8.9 Hz for L=W=0.05 m, h=1.25 mm, Y=0.05×$10^9$ N/m$^2$ for example II.

Effective Mass of Vibrating Plate in Water

From the text book "ACOUSTICS" by Leo L. Beraneck, the mechanical impedance of a circular disk with air load upon both side surfaces is:

$$Z=R+jX R=((\omega a/2V_s)^4\pi a^2\rho V_s X=((\omega a/V_s)\pi a^2\rho V_s \tag{4}$$

where ($\omega$=angular frequency, $V_s$=sound velocity, $\rho$=density of air, a=radius of the disk. This equation should be applicable for any acoustic medium. At a low frequency in water, R<<X because $\omega a/V_s$<<1. (Example $\omega a/V_s=10^{-3}$ at 10 Hz, $V_s$=1000 m/s, a=0.025 m, $\rho$=1000 Kg/m$^3$). From the definition of impedance, if a sinusoidal force is applied to the plate, the relation with the velocity or displacement is:

$$F=Zv=Z\partial x/\partial t-jX\partial x/\partial t, \ x=x_0\cos\omega t \tag{5}$$

where v is velocity, x is sinusoidal displacement and $x_0$ is its amplitude. jX is the imaginary part of Z, and it means the phase of F is 90° off from the phase of $\partial x/\partial t=-x_0 \omega \sin \omega t$ therefore, $$F=-jXx_0\omega \sin \omega t=-Xx_0\omega \cos \omega t \tag{6}$$

On the other hand, another known principle tells us that the plate has water loaded effective mass M, and the necessary force F to move the plate a distance x is:

$$F=M\partial v/\partial t=M\partial^2 x/\partial t^2=-M\omega^2 x_0 \cos \omega t \tag{7}$$

Setting equation (6)=(7), and using (4) for X:

$$-Xx_0 \cos \omega t=-(\omega a/V_s)\pi a^2\rho V_s\omega x_0 \cos \omega t=-M\omega^2 x_0 \cos \omega t$$

we get $$M=\rho\pi a^3 \text{ or } \rho(\pi a^2)a$$

The above expression for M means that the effective mass due to water is product of water density $\rho$, area $\pi a^2$, and radius a. In other words, water in the thickness a along the eel surface moves together with plate. If the plate is not a disk, but rectangular plate of area A and two sides $a_1$, and $a_2$, the effective mass will be:

$$M=\rho Aa' \text{ and } A=a_1a_2, \ a'=(a_1a_2/\pi)^{0.5}$$

where $a'=a_1a_2/\pi$ is the radius for the equivalent circular area $\pi(a')^2=a_1a_2$. For a bending motion of a two sided fixed elastic plate with width; w, length L in water, the vibration is largest at the center as shown in the above sketch, and the effective area will be A~wL/2, and $a'=(wL/2\pi)^{0.5}$ $$M=\rho wL(wL/2\pi)^{0.5} \tag{8}$$

What is claimed is:

1. A piezoelectric power generator comprising an axially elongated, flexible first layer of a dielectric material and a plurality of piezoelectric elements disposed in axially spaced apart relationship on opposite sides of said layer, each of said elements comprising a layer of flexible piezoelectric material having oppositely disposed electrodes on opposite sides thereof, said piezoelectric material layer of all the elements on one side of said first layer being integral portions of a continuous layer of said piezoelectric material, the electrodes of adjacent piezoelectric elements on said one side of said first layer being spaced apart and exposing portions of said piezoelectric material layer, and terminal electrodes extending axially along said one side of said first layer and overlying successive ones of said spaced apart electrodes and being electrically insulated from all said electrodes except respective ones of said electrodes.

2. A power generator according to claim 1 including a vortex generating bluff body secured to one end of said first layer and axially spaced from at least some of said piezoelectric elements.

3. A piezoelectric power generator comprising an axially elongated, flexible first layer of a dielectric material and a plurality of piezoelectric elements disposed in axially spaced apart relationship on one side of said layer, each of said elements comprising a layer of a flexible piezoelectric material having oppositely disposed electrodes on opposite sides thereof, said piezoelectric material layer of all the elements on said one side of said first layer being integral portions of a continuous layer of said piezoelectric material, the electrodes of adjacent piezoelectric elements on said one side of said first layer being spaced apart and exposing portions of said piezoelectric material layer, and terminal electrodes extending axially along said one side of said first layer and overlying successive ones of said spaced apart electrodes and being electrically insulated from all said electrodes except respective ones of said electrodes.

4. A generator in accordance with claim 3 wherein one of said electrodes of each of said piezoelectric elements faces towards said first layer, and said one side of said first layer comprises continuous, non-broken surfaces to which the entire facing surfaces of respective said piezoelectric elements arm adhered for flexure of said elements in correspondence with flexure of said first layer.

5. A generator in accordance with claim 3 wherein said first layer assumes during flexure thereof, a sinusoidal configuration including fixedly disposed peaks and valleys, and each of said piezoelectric elements is disposed to overlie only a respective one of said peak and valleys.

6. A piezoelectric power generator comprising a flexible first layer of a dielectric material and a plurality of piezoelectric elements disposed in spaced apart relationship on one side of said layer, each of said elements comprising a layer of a flexible piezoelectric material having oppositely disposed electrodes on opposite sides thereof, one of said electrodes of each of said piezoelectric elements facing towards said first layer, and said one side of said first layer comprises continuous, non-broken surfaces to which the entire facing surfaces of respective said piezoelectric elements are adhered for flexure of said elements in correspondence with flexure of said first layer.

7. A generator in accordance with claim 6 wherein said first layer assumes, during flexure thereof, a sinusoidal configuration including fixedly disposed peaks and valleys, and each of said piezoelectric elements is disposed to overlie only a respective one of said peaks and said valleys.

* * * * *

UNITED STATES PATENT AND TRADEMARK OFFICE
CERTIFICATE OF CORRECTION

| | |
|---|---|
| PATENT NO. | : 6,424,079 B1 |
| APPLICATION NO. | : 09/384822 |
| DATED | : July 23, 2002 |
| INVENTOR(S) | : Charles B. Carroll |

It is certified that error appears in the above-identified patent and that said Letters Patent is hereby corrected as shown below:

The specification is to be amended to include the following statement which is to be inserted in Column 1, after the title and before "This application claims the benefit of provisional . . . " :

--This invention was made with Government support under Contract/ Grant N00014-98-C-0286 awarded by the Department of the Navy. The government has certain rights in the invention.--

Signed and Sealed this

Thirtieth Day of January, 2007

JON W. DUDAS
*Director of the United States Patent and Trademark Office*